US012643246B2

(12) United States Patent
Liu et al.

(10) Patent No.: US 12,643,246 B2
(45) Date of Patent: Jun. 2, 2026

(54) ROBOTIC END EFFECTORS AND SOFT GRIPPERS THEREOF

(71) Applicant: Hong Kong Centre for Logistics Robotics Limited, Hong Kong (CN)

(72) Inventors: Yunhui Liu, Hong Kong (CN); Jianshu Zhou, Hong Kong (CN); Hanwen Cao, Hong Kong (CN); Tsz Fung Au, Hong Kong (CN)

(73) Assignee: HONG KONG CENTRE FOR LOGISTICS ROBOTICS LIMITED, Hong Kong (CN)

( * ) Notice: Subject to any disclaimer, the term of this patent is extended or adjusted under 35 U.S.C. 154(b) by 948 days.

(21) Appl. No.: 17/822,809

(22) Filed: Aug. 29, 2022

(65) Prior Publication Data

US 2024/0066721 A1     Feb. 29, 2024

(51) Int. Cl.
  *B25J 15/00*        (2006.01)
  *B25J 15/12*        (2006.01)

(52) U.S. Cl.
  CPC ........... *B25J 15/12* (2013.01); *B25J 15/0023* (2013.01)

(58) Field of Classification Search
  CPC ........ B25J 15/12; B25J 15/08; B25J 15/0023; B25J 15/0004; B25J 9/1612
  (Continued)

(56) References Cited

U.S. PATENT DOCUMENTS 4,410,210 A * 10/1983 de Sivry ................. E21B 19/22
                                                  294/102.1
4,808,898 A *  2/1989 Pearson ............. G05B 19/4202
                                                  318/599
(Continued)

FOREIGN PATENT DOCUMENTS

CN      105583821 A     5/2016
CN      107350992 A    11/2017
            (Continued)

OTHER PUBLICATIONS

Michael T. Tolley, et al. A Resilient, Untethered Soft Robot, Soft Robotics, 2014, 213-223, vol. 1, No. 3, Mary Ann Liebert, Inc.

*Primary Examiner* — Paul T Chin
(74) *Attorney, Agent, or Firm* — EAGLE IP LIMITED

(57)                 ABSTRACT

One example embodiment is a robotic end effector, comprising: (a) a soft gripper and (b) an electro-hydraulic actuator assembly. The soft gripper comprises: a gripper body comprising a finger connecting portion; and at least two fingers connected to the finger connecting portion. The gripper body further comprises a gripper cavity therein. The finger connecting portion and the at least two fingers define a working space therewithin, the working space comprises an opening between proximal ends of the at least two fingers. Each of the at least two fingers further comprises a finger barb substantially extending into the opening to partially close up the opening. The electro-hydraulic actuator assembly comprises: an actuator that is operatively driven by an electric motor; and a chamber that comprises a chamber variable volume controlled by the actuator. The chamber variable volume is in liquid communication with the gripper cavity to form a closed space filled with a liquid. Other example embodiments are described herein. In certain embodiments, the provided soft grippers and robotic end effectors are compact, powerful and is highly suitable for tasks that require fine gripping motion of small objects with diverse range of sizes, shapes, and textures with high precision, such as drug sorting and dispensation.

18 Claims, 7 Drawing Sheets

(58) Field of Classification Search
USPC ........................................................ 294/99.1
See application file for complete search history.

(56) References Cited

U.S. PATENT DOCUMENTS

| | | | | |
|---|---|---|---|---|
| 6,059,336 | A * | 5/2000 | Meronek ............. | E21B 33/0387 |
| | | | | 279/57 |
| 7,000,311 | B1 * | 2/2006 | Reimann ............ | H05K 13/0409 |
| | | | | 294/185 |
| 9,528,532 | B2 | 12/2016 | Simmons | |
| 10,543,602 | B2 | 1/2020 | Zhang | |
| 2015/0113798 | A1 * | 4/2015 | Zhang ........................ | B23P 6/00 |
| | | | | 29/729 |
| 2015/0257839 | A1 * | 9/2015 | Vause .................. | A61B 17/221 |
| | | | | 606/130 |
| 2015/0375817 | A1 | 12/2015 | Tolley et al. | |
| 2017/0252930 | A1 * | 9/2017 | Birglen .................. | B25J 9/1065 |
| 2017/0297210 | A1 * | 10/2017 | Takikawa ............. | B25J 19/0091 |
| 2019/0358832 | A1 * | 11/2019 | Zhang ....................... | B43K 5/18 |
| 2020/0180166 | A1 * | 6/2020 | Nitta ........................ | B25J 15/12 |
| 2020/0238541 | A1 * | 7/2020 | Hatano .................. | B25J 9/0012 |
| 2021/0129355 | A1 * | 5/2021 | Son ....................... | B25J 15/0033 |
| 2021/0379772 | A1 * | 12/2021 | Morimura ............ | B25J 15/0028 |

FOREIGN PATENT DOCUMENTS

| | | |
|---|---|---|
| CN | 111405968 A | 7/2020 |
| CN | 113415565 A | 9/2021 |
| CN | 216682247 U | 6/2022 |
| EP | 1408241 A2 | 4/2004 |

* cited by examiner

1220

1210

ROBOTIC END EFFECTORS AND SOFT GRIPPERS THEREOF

FIELD OF INVENTION

This invention relates to robotic devices, and in particular soft grippers and robotic end-effectors comprising the same.

BACKGROUND OF INVENTION

Population aging is a serious global issue. There is an extremely high demand in finding efficient, accurate and automated solutions for drug manipulation and/or dispensing for the elderly. Robotic systems have been employed to perform various repetitious and tedious tasks, such as object recognition and object grasping. However, available robotic grippers in existing robotic systems are not specially designed for fine gripping action of smaller objects (such as drugs) with diverse range of sizes, shapes, and textures. It is highly desired to provide novel robotic systems, end effectors and grippers for grasping smaller objects with diverse range of sizes, shapes, and textures, for example but not limited to, drugs such as pills, capsules, soft gels and tablets.

SUMMARY OF INVENTION

In light of the foregoing background, in certain embodiments, it is an object to provide improved soft grippers and robotic end effectors for grasping smaller objects, for example drugs such as pills, capsules, soft gels and tablets.

Accordingly, in one aspect, provided is a robotic end effector, comprising: (a) a soft gripper and (b) an electro-hydraulic actuator assembly. The soft gripper comprises: a gripper body comprising a finger connecting portion; and at least two fingers connected to the finger connecting portion. The gripper body further comprises a gripper cavity therein. The finger connecting portion and the at least two fingers define a working space therewithin, the working space comprises an opening between proximal ends of the at least two fingers. Each of the at least two fingers further comprises a finger barb substantially extending into the opening to partially close up the opening. The electro-hydraulic actuator assembly comprises: an actuator that is operatively driven by an electric motor; and a chamber that comprises a chamber variable volume controlled by the actuator. The chamber variable volume is in liquid communication with the gripper cavity to form a closed space filled with a liquid, such that when in operation, the shape of the gripper cavity can be changed in response to a liquid pressure under control of the chamber variable volume by the electro-hydraulic actuator assembly, such as to control a finger gap between the at least two fingers, thereby controlling gripping action of an object by the at least two fingers at least partially within the working space.

In another aspect, provided is a robotic end effector, comprising: (a) a soft gripper and (b) an electro-hydraulic actuator assembly. The soft gripper comprises a gripper body comprising a finger connecting portion; and two fingers extending from the finger connecting portion. The gripper body further comprises a gripper cavity therein. The finger connecting portion and the two fingers define a working space therewithin with an opening between proximal ends of the two fingers. Each of the two fingers further comprises a finger barb substantially extending into the opening to partially close up the opening. The electro-hydraulic actuator assembly comprises: an actuator that is operatively driven by an electric motor; and a chamber that comprises a chamber variable volume controlled by the actuator. The chamber variable volume is in liquid communication with the gripper cavity to form a closed space filled with a liquid, such that when in operation, under normal liquid pressure, the gripper cavity maintains at a resting state; under negative liquid pressure, the gripper cavity will be deformed into one or more contracting states; the shape of the gripper cavity changes in response to the negative liquid pressure by reducing the chamber variable volume under control of the electro-hydraulic actuator assembly such that a finger gap between the at least two fingers is reduced, thereby the opening is reduced; and under higher liquid pressure, the gripper cavity will be deformed into one or more expanding states; the shape of the gripper cavity in the working states changes in response to the higher liquid pressure by increasing the chamber variable volume under control of the electro-hydraulic actuator assembly such that the finger gap is enlarged, thereby the opening is enlarge.

In another aspect, provided is a soft gripper, comprising: a gripper body comprising a finger connecting portion; and at least two fingers connected to the finger connecting portion. The gripper body further comprises a gripper cavity therein. The finger connecting portion and the at least two fingers define a working space therewithin, the working space comprises an opening between proximal ends of the at least two fingers. Each of the at least two fingers further comprises a finger barb substantially extending into the opening to partially close up the opening.

Other example embodiments will be described below.

There are many advantages to the present disclosure.

For example, in certain embodiments, the robotic end effector includes an electrically powered hydraulic actuator that is able to power the soft gripper to perform opening and closing movements precisely. The actuator contains an electric motor and a variable volume chamber whose volume is adjusted by the motor in a precise manner. The chamber of the actuator is in liquid communication with the gripper cavity of the soft gripper allowing the liquid flowing from one to the other. Upon changing (i.e., increasing or decreasing) the volume of the actuator chamber and gripper cavity, gripper fingers move (e.g., opens or closes) powerfully and precisely. In some embodiments, since the actuator is operatively driven by an electric motor, it is easy to power. The robotic end effector as disclosed does not require extra air pumps or hydraulic pumps because it is active, i.e., the end effector contains an actuator. In some embodiments, the electrically powered hydraulic actuator is lighter, more compact, and produce lower noise, compared to other actuators that additionally requires a vacuum air pump or a hydraulic pump. In some embodiments, compared to robotic grippers that are pneumatically actuated, the hydraulically actuated robotic end effector as disclosed can actuate the soft gripper in a more powerful and precise manner, considering the fact that liquid is less compressible than gas. In some embodiments, the robotic end effector as disclosed does not require pressure sensor due to the accuracy of the electro-hydraulic hybrid actuator. In some embodiments, as the soft gripper is made of one or more elastomer materials, it can prevent small or fragile objects (such as pills, capsules) from being damaged by the gripping force. The combination of an electro-hydraulic hybrid actuator and a soft gripper also has the advantage of precise control over the motion of the fingers (such as position and speed). In contrast, conventional robotic fingers can only either fully open or fully close. Therefore, the provided robotic end effectors are highly suitable for tasks that require fine gripping motion of small objects with high precision, such as drug sorting and dispensation.

DETAILED DESCRIPTION

Figure 1A:
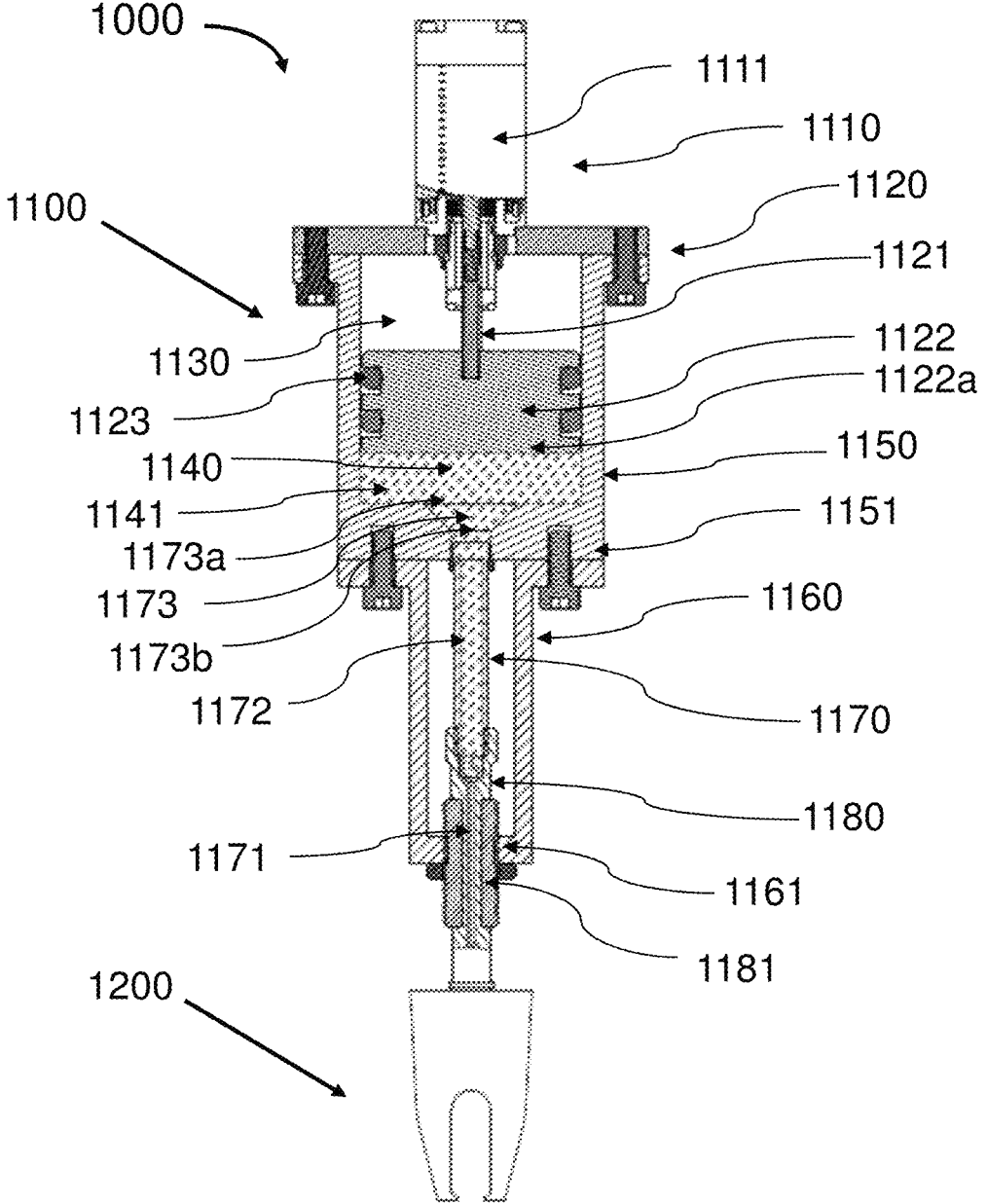
FIG. 1A is a cross-sectional view of a robotic end effector according to an example embodiment.

As used herein and in the claims, the terms "comprising" (or any related form such as "comprise" and "comprises"), "including" (or any related forms such as "include" or "includes"), "containing" (or any related forms such as "contain" or "contains") or "having" (or any related forms such as "have" or "has"), means including the following elements but not excluding others. It shall be understood that for every embodiment in which the term "comprising" (or any related form such as "comprise" and "comprises"), "including" (or any related forms such as "include" or "includes"), "containing" (or any related forms such as "contain" or "contains") or "having" (or any related forms such as "have" or "has") is used, this disclosure/application also includes alternate embodiments where the term "comprising", "including,", "containing," or "having" is replaced with "consisting essentially of" or "consisting of". These alternate embodiments that use "consisting of" or "consisting essentially of" are understood to be narrower embodiments of the "comprising", "including," or "containing," embodiments.

For the sake of clarity, "comprising", including, "containing" and "having", and any related forms are open-ended terms which allows for additional elements or features beyond the named essential elements, whereas "consisting of" is a closed end term that is limited to the elements recited in the claim and excludes any element, step, or ingredient not specified in the claim.

As used herein, the term "robotic end effector" or "end effector" refers to a device that can be installed at the end of a robotic arm to interact with the environment, such as to grasp one or more objects.

As used herein, the term "electro-hydraulic actuator" refers to a device that is operatively driven by an electrical source of energy to control the pressure of hydraulic fluid.

As used herein, the term "gripper" refers to a device that is designed to grip and hold one or more objects by at least two fingers.

As used herein, the term "robotic finger" or "finger" refers to a part or a digit of the robotic end effector to perform the grasping of one or more objects, usually with another one or more.

As used herein and in the claims, the term "soft" refers to a property of a material which is flexible and at least partially deformable.

As used herein and in the claims, the term "in liquid communication" refers to a connection between two components such that at least one liquid can flow through from one component to another.

As used herein and in the claims, the term "finger gap" refers to the transverse distance between the finger bodies of at least two fingers.

As used herein and in the claims, the term "resting state" refers to a state of the soft gripper in which the gripper cavity is under normal pressure, i.e. the gripper cavity liquid pressure is substantially balanced with the external atmospheric pressure.

As used herein and in the claims, the term "expanding states" refers to one or more states of the soft gripper in which the gripper cavity is under positive pressure, i.e. the gripper cavity pressure is larger than the external pressure so that the finger gap is larger than that in the resting state, for example, when the liquid is compressed by reducing the chamber variable volume under control of the actuator.

As used herein and in the claims, the term "contracting states" refers to one or more states of the soft gripper in which the gripper cavity is under negative pressure, i.e. the gripper cavity pressure is lower than the external pressure so that the finger gap is smaller than the resting state, for example, when the liquid is de-compressed by increasing the chamber variable volume under control of the actuator.

As used herein and in the claims, the terms "general" or "generally", or "substantial" or "substantially", or "about" mean that the recited characteristic, angle, shape, state, structure, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, an object that has a "generally" equilateral triangle shape would mean that the object has either an exact equilateral triangle shape or a nearly exact equilateral triangle shape. In another example, an object that is "substantially" perpendicular to a surface would mean that the object is either exactly perpendicular to the surface or nearly exactly perpendicular to the surface, e.g., has a 5% deviation.

It is to be understood that terms such as "proximal", "distal", "top", "bottom", "middle", "side", "length", "width", "longitudinal", "transverse", "vertical", "inner", "outer", "interior", "exterior," and the like as may be used herein, merely describe points of reference and do not limit the present invention to any particular orientation or configuration.

In some embodiments, provided is a robotic end effector, comprising: (a) a soft gripper, comprising: a gripper body comprising a finger connecting portion; and at least two fingers connected to the finger connecting portion, wherein the gripper body further comprises a gripper cavity therein; wherein the finger connecting portion and the at least two fingers define a working space therewithin, the working space comprises an opening between proximal ends of the at least two fingers; wherein each of the at least two fingers further comprises a finger barb substantially extending into the opening to partially close up the opening; and (b) an electro-hydraulic actuator assembly, comprising: an actuator that is operatively driven by an electric motor; and a chamber that comprises a chamber variable volume controlled by the actuator, wherein the chamber variable volume is in liquid communication with the gripper cavity to form a closed space filled with a liquid, such that when in operation, the shape of the gripper cavity can be changed in response to a liquid pressure under control of the chamber variable volume by the electro-hydraulic actuator assembly, such as to control a finger gap between the at least two fingers, thereby controlling gripping action of an object by the at least two fingers at least partially within the working space.

In some embodiments, the at least two fingers and the gripper body are casted as a single piece made of one or more elastomer materials.

In some embodiments, the gripper cavity substantially extends into the finger connecting portion, and the at least two fingers are substantially solid.

In some embodiments, the finger connecting portion comprises at least one side wall and a finger connecting wall that together define the gripper cavity, the at least one side wall is configured to be thicker than the finger connecting wall.

In some embodiments, the finger connecting wall is arc-shaped.

In some embodiments, the at least two fingers are equidistantly spaced relative to a central longitudinal axis of the gripper.

In some embodiments, a ratio of length of the finger connecting portion to length of the at least two fingers is substantially equal to or smaller than 1:1.

In some embodiments, the finger gap between the at least two fingers is substantially equal or larger than width of each of the at least two fingers.

In some embodiments, the electro-hydraulic actuator assembly further comprises: a piston rod sized and shaped to match with the chamber to form the variable volume; and a push rod that connects the electric motor with the piston rod, wherein the electric motor is configured to provide rotational force to the push rod and translate into linear force to the piston rod.

In some embodiments, the piston rod further comprises at least one sealing ring.

In some embodiments, the robotic end effector further comprises a channel connecting the chamber and the gripper in liquid communication.

In some embodiments, the channel further comprises: a proximal channel having a proximal channel cross section; and a distal channel having a distal channel cross section, wherein the distal channel connects the proximal channel and the chamber in liquid communication.

In some embodiments, the distal channel cross section is smaller than a cross section of the chamber but larger than the proximal channel cross section.

In some embodiments, the chamber further comprises a reduced diameter port configured to connect with the distal channel in liquid communication.

In some embodiments, the robotic end effector further comprises a buffer sized and shaped to substantially cover connection region between the proximal channel and the distal channel.

In some embodiments, the robotic end effector further comprises a fixing flange that is fixedly connected with the chamber and is sized and shaped to cover at least a portion of the channel.

In some embodiments, the fixing flange further comprises a proximal opening, and wherein the buffer further comprises a threaded region sized and shaped to thread with the proximal opening.

In some embodiments, provided is a robotic end effector, comprising: (a) a soft gripper, comprising: a gripper body comprising a finger connecting portion; and two fingers extending from the finger connecting portion, wherein the gripper body further comprises a gripper cavity therein; wherein the finger connecting portion and the two fingers define a working space therewithin with an opening between proximal ends of the two fingers, wherein each of the two fingers further comprises a finger barb substantially extending into the opening to partially close up the opening; and (b) an electro-hydraulic actuator assembly, comprising an actuator that is operatively driven by an electric motor; and a chamber that comprises a chamber variable volume controlled by the actuator, wherein the chamber variable volume is in liquid communication with the gripper cavity to form a closed space filled with a liquid, such that when in operation, under normal liquid pressure, the gripper cavity maintains at a resting state; under negative liquid pressure, the gripper cavity will be deformed into one or more contracting states; the shape of the gripper cavity changes in response to the negative liquid pressure by reducing the chamber variable volume under control of the electro-hydraulic actuator assembly such that a finger gap between the at least two fingers is reduced, thereby the opening is reduced; and under higher liquid pressure, the gripper cavity will be deformed into one or more expanding states; the shape of the gripper cavity in the working states changes in response to the higher liquid pressure by increasing the chamber variable volume under control of the electro-hydraulic actuator assembly such that the finger gap is enlarged, thereby the opening is enlarge.

In some embodiments, provided is a soft gripper, comprising: a gripper body comprising a finger connecting portion; and at least two fingers connected to the finger connecting portion, wherein the gripper body further comprises a gripper cavity therein; wherein the finger connecting portion and the at least two fingers define a working space therewithin, the working space comprises an opening between proximal ends of the at least two fingers; and wherein each of the at least two fingers further comprises a finger barb substantially extending into the opening to partially close up the opening.

In some embodiments, the at least two fingers and the gripper body are casted as a single piece made of one or more elastomer materials.

In some embodiments, the gripper cavity substantially extends into the finger connecting portion, and the at least two fingers are substantially solid.

In some embodiments, the finger connecting portion comprises at least one side wall and a finger connecting wall that together define the gripper cavity, the at least one side wall is configured to be thicker than the finger connecting wall.

In some embodiments, the finger connecting wall is arc-shaped.

In some embodiments, the at least two fingers are equidistantly spaced relative to a central longitudinal axis of the gripper.

In some embodiments, a ratio of length of the finger connecting portion to length of the at least two fingers is substantially equal to or smaller than 1:1.

In some embodiments, the finger gap is substantially equal or larger than width of each of the at least two fingers.

In the following description, same numberings are employed to illustrate the same components of different figures.

Provided herein are examples that describe in more detail certain embodiments of the present disclosure. The examples provided herein are merely for illustrative purposes and are not meant to limit the scope of the invention in any way. All references given below and elsewhere in the present application are hereby included by reference.

Example 1

Robotic End Effector 1000

Referring now to FIG. 1A, which shows an example embodiment of a robotic end effector 1000. The robotic end effector 1000 generally includes an electro-hydraulic actuator assembly 1100 and a soft gripper 1200. For ease of description, the direction towards the finger barb of the soft gripper 1200 is called "proximal", and the direction away from the finger barb of the soft gripper 1200 is called "distal".

The electro-hydraulic actuator assembly 1100 includes an actuator 1110, a hydraulic system 1120 that is connected with the actuator 1110, and an elongated channel 1170 that is connected with the soft gripper 1200. The actuator 1110 is operatively driven by an electric motor 1111. The hydraulic system 1120 includes a shell 1150 defining a generally cylindrical chamber 1130 therein, a push rod 1121 and a piston rod 1122 housed in the chamber 1130. The push rod 1121 are connected with the electric motor 1111 at a distal end, and connected with the piston rod 1122 at the opposite, proximal end. The electric motor 1111 is configured to operatively provide rotational force to the push rod 1121 and subsequently translate into linear (upward or downward) force to the piston rod 1122. In some embodiments, the piston rod 1122 and the push rod 1121 are fixed with screw connection. The piston rod 1122 is sized and shaped to match with the transverse cross-section of the chamber 1130, together forming a chamber variable volume 1140 within the chamber 1130, between the proximal side 1122*a* of the piston rod 1122 and the shell 1150. In this embodiment, the piston rod 1122 further contains two sealing rings 1123 for fluid sealing. The chamber variable volume 1140 is filled with liquid 1141 that is used as a hydraulic fluid in the hydraulic system 1120.

Still referring to FIG. 1A, the channel 1170 connects with the chamber 1130 and the soft gripper 1200 in liquid communication. The channel 1170 further contains a proximal channel 1171 and a distal channel 1172. The distal channel 1172 connects between the proximal channel 1171 and the chamber 1130 in liquid communication, whereas the proximal channel 1171 connects with the soft gripper 1200 in liquid communication. As such, the chamber 1130, the channel 1170 and the soft gripper 1200 are connected with each other in liquid communication to form a closed space filled with liquid 1141. In this embodiment, the chamber 1130 further includes a reduced diameter port 1173 disposed at the proximal end of the chamber 1130 and configured to connect with the distal channel 1172 in liquid communication. The reduced diameter port 1173 contains a port distal end 1173*a* connected with the chamber 1130 and a port proximal end 1173*b* connected with the distal channel 1172.

The reduced diameter port 1173 has a diameter that is gradually decreased from the port distal end 1173*a* to the portal proximal end 1173*b*. In this embodiment, the transverse cross section (or the diameter) of the distal channel 1172 is smaller than that of the chamber 1130, but larger than that of the proximal channel 1171. In this example, the channel 1170 is provided as two channel components (i.e., distal channel 1172 and the proximal channel 1171) which are sealed together to form a part of the closed space when they are joined together. In some embodiments, the channel 1170 is configured to be detachable and changeable from the electro-hydraulic actuator assembly 1100. As such, the chamber 1130 can be readily adopted with different channels with various sizes (diameters and/or lengths), materials and shapes to adjust the gripping forces and the gripping speeds of the soft gripper 1200 according with the user's preference and actual need. The electro-hydraulic actuator assembly 1100 further includes a buffer 1180 sized and shaped to substantially cover the connection region between the proximal channel 1171 and the distal channel 1172. In this embodiment, the buffer 1180 substantially cover the entire length of the proximal channel 1171 to provide better protection thereof and to prevent fluid leakage even at higher liquid pressures. In this embodiment, the electro-hydraulic actuator assembly 1100 further contains a fixing flange 1160 that is fixedly connected with the proximal side 1151 of the shell 1150 and is sized and shaped to cover at least a portion of the channel 1170. The fixing flange 1160 has a proximal opening 1161, and the buffer 1180 has a threaded region 1181 sized and shaped to thread with the proximal opening 1161, such that the buffer 1180 is fixedly connected with the fixing flange 1160 via threaded connection to secure the position of the channel 1170 relative to the shell 1150. The structure of the soft gripper 1200 will be described in more detail below.

Soft Gripper 1200

Figure 1B:
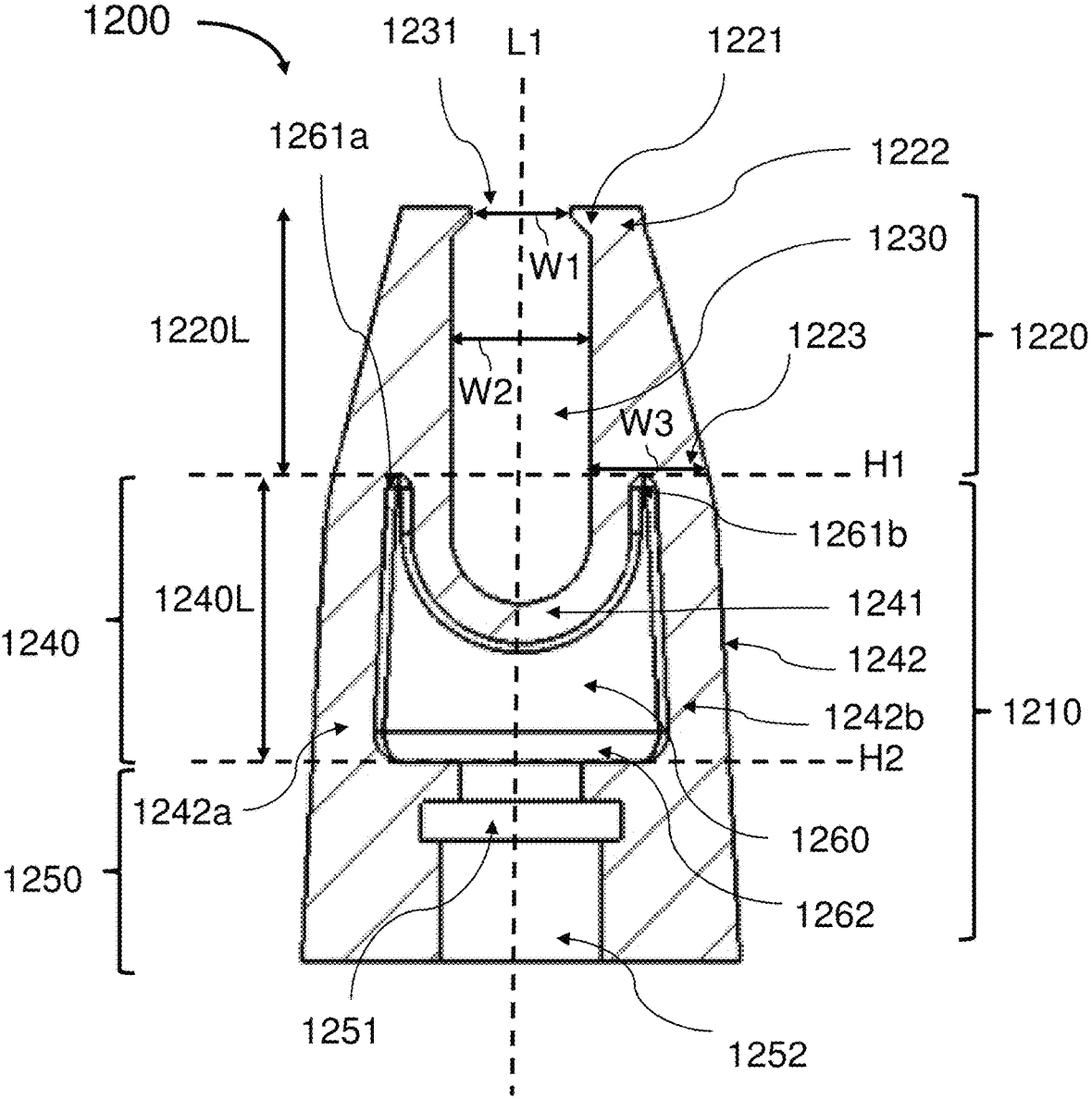
FIG. 1B is a cross-sectional view of a soft gripper of the robotic end effector according to the same example embodiment as shown in FIG. 1A.
Figure 1C:
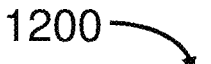
FIG. 1C is a side view of the soft gripper according to the same example embodiment as shown in FIG. 1B.
Figure 1C:
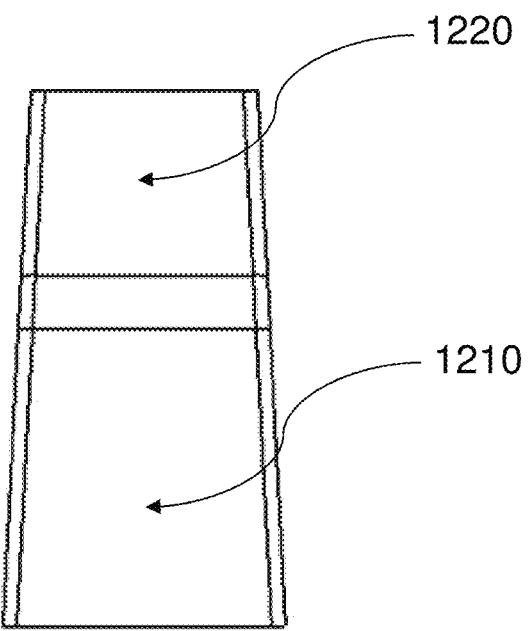

Referring now to FIGS. 1B and 1C, which shows the detailed structure of the soft gripper 1200 as shown in FIG. 1A. The soft gripper 1200 includes two major portions divided by a horizontal dotted line H1 (as shown in FIG. 1B), namely fingers 1220 and a gripper body 1210. In this embodiment, the soft gripper 1200 has two fingers 1220. In some embodiments, the two fingers 1220 and the gripper body 1210 are casted as a single piece, substantially made of one or more liquid glue-like elastomer materials such that the soft gripper 1200 is at least partially deformable. In one embodiment, the elastomer material is or contains silicone.

As shown in FIG. 1B, a horizontal line H2 further divides the gripper body 1210 into a finger connecting portion 1240 and a base portion 1250. The gripper body 1210 further includes a gripper cavity 1260 therein. In this embodiment, the finger connecting portion 1240 includes four side walls 1242 (only two side walls 1242*a* and 1242*b* were shown in the cross-section view in FIG. 1B) and a finger connecting wall 1241. The side walls 1242 and the finger connecting wall 1241 together define the gripper cavity 1260 therebetween. The finger connecting wall 1242 contains two ends connected with or integrally form the two fingers 1220 respectively. The thickness or deformation resistance of the finger connecting wall 1241 is configured to be smaller than that of the side walls 1242. In this embodiment, the finger connecting wall 1241 is arc-shaped and bent towards the gripper cavity 1260, thereby forming two cavity proximal edges 1261*a* and 1261*b* at the intersections between the finger connecting wall 1242 and the side walls 1242*a* and 1242*b* respectively. In some embodiments, the two cavity proximal edges 1261*a* and 1261*b* of the gripper cavity 1260 substantially extend into the finger connecting portion 1240, but do not extend into the two fingers 1220. In other words, the two fingers 1220 are solid and dense without any space or cavity therewithin. The base portion 1250 of the gripper body 1210 contains a connecting port 1252 and a slot 1251. The connecting port 1252 connects with a distal side 1262 of the gripper cavity 1260 at one end and connects with the proximal channel of the electro-hydraulic actuator assembly (as shown in FIG. 1A) at an opposite end, such as to connect the gripper cavity 1260 and the proximal channel in liquid communication. The slot 1251 is configured to receive at least a portion of the buffer (as shown in FIG. 1A) to secure the relative positions of the channel and the soft gripper 1200. As such, the chathber variable volume (as shown in FIG. 1A) is in direct or indirect liquid communication with the gripper cavity 1260 to form a closed space filled with a liquid, such that when in operation, the shape of the gripper cavity 1260 can be changed in response to a liquid pressure under control of the chamber variable volume by the electro-hydraulic actuator assembly, such as to control the finger gap W2 between the two fingers 1220, thereby controlling gripping action of an object by the two fingers. The operation of the robotic effector will be described later in more detail.

In this embodiment, the two fingers 1220 extend from the proximal side of the finger connecting portion 1240. The two fingers 1220 equidistantly spaced relative to a central longitudinal axis L1 of the soft gripper 1200. Each of the two fingers 1220 has a finger distal end 1223 connecting with the finger connecting portion 1240 and an opposing finger proximal end 1222. In this embodiment, the vertical cross section of each finger 1220 has a generally right-angled trapezoidal shaped finger body with a width gradually decreases from the finger distal end 1223 to the finger proximal end 1222. The transverse width of finger distal end 1223 of each finger is labelled as W3 in FIG. 1B. The finger connecting portion 1240 and the two fingers 1220 define a working space 1230 therewithin. The working space 1230 includes an opening 1231 with a width W1 between finger proximal ends 1222 of the two fingers (FIG. 1B). In this embodiment, each of the two fingers 1220 further contains a finger barb 1221 substantially extending from the finger proximal end 1222 towards the longitudinal axis L1 into the opening 1231 to partially close up the opening. For clarity, "partially closing up the opening" means that at the resting state, the transverse cross-section of the opening 1231 and the width W1 are generally smaller than the transverse cross-section and finger gap W2 of the working space 1230, respectively. The provided finger barb 1221 on each of the two fingers 1220 improves the clamping effect of the soft gripper 1200, making it easier to grasp and hold an object at least partially within the working space 1230. In addition, the provided finger barb 1221 also allows an object of a size substantially less than the size of the working space 1230 being scooped up and held within the working space without the need of providing continuous grasping force between the fingers, such that the object will not be squeezed or damaged by the fingers 1220.

In some embodiments, when at a resting state, the finger gap W2 is substantially equal or larger than the transverse width of the finger distal end W3. In this embodiment, the ratio of the finger gap W2 to transverse width of the finger distal end W3 is about 1:1.2. As such, the finger gap W2 and the size of the opening 1231 can be enlarged to a greater extent under positive liquid pressure, which allows the soft gripper to wrap, grasp and hold large objects within the working space 1230 when in use. In some embodiments, the opening 1231 can be enlarged to be even larger than the width of the gripper body 1210 under positive liquid pressure for holding large objects.

Still referring to FIG. 1B, in this embodiment, the length of the finger connecting portion (shown as 1240L in FIG. 1B) is about 14.5 mm, and the length of the finger (shown as 1220L in FIG. 1B) is about 13.5 mm. The ratio of the length of the finger connecting portion 1240L to the length of the finger 1220L is about 1:1.074. In some other embodiments, the ratio of the length of the finger connecting portion to the length of the two fingers is substantially equal or smaller than 1:1. In some embodiments, the two fingers 1220 are solid and dense substantially without any space or cavity therewithin. As such, when in operation, the fingers 1220 can operate without repeatedly expanded and shrunk in response to a liquid pressure under control of the chamber variable volume by the electro-hydraulic actuator assembly, and durability of the fingers is significantly enhanced. Since the fingers is solid and have no cavity therewithin, the fingers can grab sharp objects without the risk of fluid leakage from the fingers caused by any possible scratch or damage by the sharp objects. As the fingers are solid and dense, the elastic modulus of the fingertips are significantly increased, and therefore providing a certain degree of non-driving clamping force even under normal pressure.

Operation of the Robotic End Effector 1000

Now turning to the operation of the robotic end effector 1000 as described above by referring to FIGS. 1A-1C. The electric motor 1111 is configured to operatively provide rotational force to the push rod 1121 and subsequently translate into linear force to the piston rod 1122, in response to signals or instructions from the robotic arm that is operatively connected with the robotic end effector. For example, when the electric motor 1111 rotates in one direction, the push rod 1121 moves downward towards the direction of the soft gripper 1200, causing the piston rod 1121 to move downward and the chamber variable volume 1140 is reduced. Since the chamber 1130, the channel 1170 and the gripper cavity 1260 of the soft gripper 1200 are connected with each other to form a closed space in liquid communication, reducing the chamber variable volume 1140 reduces the overall closed space volume and causes the liquid pressure becomes higher, which drives the gripper cavity 1260 to be deformed into one or more expanding states. The shape of the gripper cavity 1260 in the working states changes in response to the higher liquid pressures, causing the finger gap W2 between the two fingers 1220 to be enlarged, thereby enlarging the opening 1231. As such, objects can be at least partially inserted within the working space 1230 through the opening 1231 in the one or more expanding states. Conversely, when the electric motor 1111 rotates in an opposing direction, the push rod 1121 and the piston rod 1122 moves up and the chamber variable volume 1140 and thus the overall closed space volume are enlarged, causing the liquid pressure becomes lower. When the chamber variable volume 1140 returns to the original state and the liquid pressure is close to or substantially equals to the normal pressure, the soft gripper 1200 will change from the one or more expanding states back to the resting state. When the chamber variable volume 1140 is further expanded from the original state and liquid pressure is further reduced, the soft gripper 1200 will change from the resting state to one or more contracting states. As such, the objects can be efficiently grasped and held within the working space of the soft gripper 1200 by controlling the end effector in different states.

Operation of the Soft Gripper 1200

The changes in the shape of the soft gripper 1200 between "resting state", "expanding states" and "contracting states" in response to changes in gripper cavity pressure will be further described herein in details by referring to FIG. 1B. The finger connecting wall 1241 is arc-shaped, and its wall thickness or anti-deformation ability is configured to be smaller than that of the side wall 1242. At the resting state, the gripper cavity liquid pressure is substantially balanced with the external pressure (normal pressure or atmospheric pressure). When a liquid medium is injected into the gripper cavity 1260 through the connection port 1252, such that the gripper cavity pressure is stronger than the external pressure (i.e., a positive pressure is created), the gripper cavity will be deformed from the resting state into one or more expanding states. The positive pressure difference generates a pressure towards the outside of the gripper cavity 1260, forcing the finger connecting wall 1241 and the side wall 1242 composed of elastomer material to swell and deform. Because the wall thickness or deformation resistance of the finger connecting wall 1241 is smaller than that of the side wall 1242, the finger connecting wall 1241 will deform to a greater extent than the side wall 1242. As a result, the finger connecting wall 1241 will be elongated, which will drive the fingers 1220 to expand outward, and since the finger gap W2 is substantially equal or larger than the width of each of the two fingers 1220 at the finger distal end 1223, the finger gap W2 will expand to a greater extent under positive pressure, and larger items can be wrapped in the working space 1230. As an example, the liquid medium is a hydraulic fluid and is or contains water, mineral oil.

When the liquid medium is extracted from the gripper cavity 1260 of the soft gripper 1200 through the connecting port 1252, such that the gripper cavity pressure is lower than the external pressure (negative pressure), the gripper cavity will be deformed into one or more contracting states. The negative pressure difference generates pressure toward the interior of the gripper cavity 1260, forcing the finger connecting wall 1241 and the side wall 1242 composed of elastomer material to shrink and deform. Since the wall thickness or deformation resistance of the finger connecting wall 1241 is smaller than that of the side wall 1242, the finger connecting wall 1242 will deform to a greater extent than the side wall. As a result, the size of the finger connecting wall 1241 will shrink, which will drive the two fingers 1223 to squeeze and close inwards. As such, the objects can be held within the working space 1230. Due to the existence of the finger barb 1221 at the proximal end of each finger, it will hinder the objects being held from falling down from the gap between the fingers (i.e. the working space 1230), which is beneficial to grasping smooth objects. When taking heavy objects and grabbing objects, the soft gripper moves at high speed; because the fingers 1220 are solid and dense, their durability is stronger than hollow fingers that frequently expand and shrink, and the fingers 1220 can grasp sharp objects without the risk of fluid leakage from the fingers caused by aby possible scratch or damage by the sharp objects. At the resting state, the gripper cavity pressure is substantially balanced with the external pressure (normal pressure), and the thickness or anti-deformation ability of the fingers 1220 is larger than that of the hollow finger, and therefore can provide a larger non-driving clamping force. In some embodiments, as the fingers 1220 are made of plastic elastomer material which is flexible, it will naturally adapt to the surface of the object being grasped. As such, the soft gripper can grasp a wide variety of objects without causing damage to the objects.

Example 2—Comparison of an Example Soft Gripper Using Electro-Hydraulic System with a Soft Pneumatic Gripper Using Pneumatic System The various tests that are to be described in the following examples (Examples 3-5) were conducted on an Example Soft Gripper 1 and a commercially available Soft Pneumatic Gripper, to exhibit the outstanding performance of the Example Soft Gripper 1 using electro-hydraulic system over a soft pneumatic gripper using pneumatic system.

Example Soft Gripper 1

Example Soft Gripper 1 generally includes a gripper body and two fingers. The structure of Example Soft Gripper 1 is generally the same with the soft gripper 1200 as described in Example 1 and FIGS. 1A-1C above. In comparison with Soft Pneumatic Gripper as described below, Example Soft Gripper 1 includes a gripper cavity that substantially extends into the finger connecting portion, but does not extend into the two fingers. In other words, the two fingers are solid and dense without any space or cavity therewithin. Each of the two fingers of the Example Soft Gripper 1 has a finger barb substantially extending from the finger proximal end into the opening to partially close up the opening. In the various experiments as described below, Example Soft Gripper 1 is controlled by the electro-hydraulic actuator assembly as described in Example 1 and FIG. 1A above.

Soft Pneumatic Gripper for Comparison

Soft Pneumatic Gripper is a commercially available pneumatically-actuated gripper with a model number of BMC-20005V[P] (Rochu). In the various experiments as described below, Soft Pneumatic Gripper are controlled by an active pneumatic controller SCB-18IAS from Soft Robot Tech Co., Ltd.

Table 1 below summarizes the detailed configurations of the Example Soft Gripper 1 and Soft Pneumatic Gripper.

TABLE 1

| Detailed configurations of the Example Soft Gripper 1 and Soft Pneumatic Gripper | | |
| --- | --- | --- |
| | Example Soft Gripper 1 | Soft Pneumatic Gripper |
| Mode of actuation | Electro-hydraulic hybrid | Pnuematic |
| Numbers of fingers | 2 | 2 |
| Material of gripper body | Silicone | Silicone |
| Gripper dimensions (mm) (length * width * height) | 20 * 22 * 38 | 22 * 20 *3 9 |
| Initial finger opening width (at resting state) (mm) | 5 | 5 |
| Gripper cavity extends into fingers | No | Yes |
| Finger barb structure | Present | Absent |

Example 3—Tests of Finger Contact Force

In this experiment, measurements were carried out to evaluate and compare the finger contact force of the Example Soft Gripper 1 and Soft Pneumatic Gripper as described in Example 2 above.

Methods and Materials

Example Soft Gripper 1 was controlled by the electro-hydraulic actuator assembly as described in Example 1 and FIG. 1A above. Soft Pneumatic Gripper was controlled by an active pneumatic controller SCB-18IAS from Soft Robot Tech Co., Ltd. Example Soft Gripper 1 and Soft Pneumatic Gripper (together with their respective actuator/controller) were installed on the same robotic arm respectively and were commanded to open the two fingers as much as possible. While the fingers were opening, a force gauge were used to measure the contact force between the finger and the force gauge. The force gauge was fixed at a proper location so that when the finger opens, the tip of the finger (i.e. the finger proximal end) can contact the sensing area of the force gauge.

Results

Figure 2:
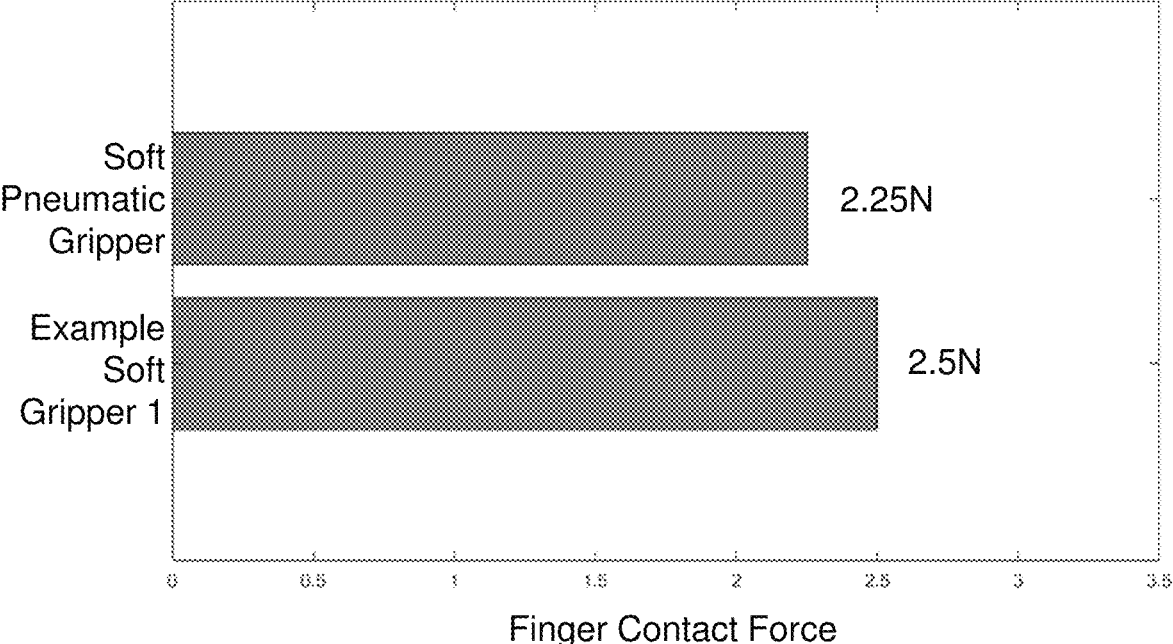
FIG. 2 is a bar chart showing a comparison of finger contact forces of Example Soft Gripper 1 and Soft Pneumatic Gripper in accordance with example embodiments.

The maximum finger contact forces of the Example Soft Gripper 1 and the Soft Pneumatic Gripper were plotted and shown in FIG. 2. The maximum finger contact force of the Example Soft Gripper 1 is 2.5N, while the maximum finger contact force of the Soft Pneumatic Gripper is only 2.25N. The results indicate that the fingers in Example Soft Gripper 1 powered by the electro-hydraulic actuator assembly can generate a significantly larger force than the Soft Pneumatic Gripper powered by the pneumatic controller. Therefore, Example Soft Gripper 1 can potentially grasp heavier objects than the Soft Pneumatic Gripper.

Example 4—Tests of Finger Control Precision and Finger Motion Range

In this experiment, the control precision of the fingers and the finger motion range of the Example Soft Gripper 1 and Soft Pneumatic Gripper as described in Example 2 were evaluated and compared.

Methods and Materials

Example Soft Gripper 1 and Soft Pneumatic Gripper (together with their respective actuator/controller) are installed on the same robotic arm respectively for the test. For Example Soft Gripper 1, a sequence of constant volume of liquid were inputted via the electro-hydraulic actuator assembly into the soft gripper. The finger opening width was measured when the soft gripper was at a resting state and when after each input. Both the finger gap and the overall width of the soft gripper at the finger proximal ends were measured and averaged to obtain the finger opening width. For comparison, Soft Pneumatic Gripper was controlled by a commercially available pneumatic controller mentioned above. Since the pneumatic controller can only output constant pneumatic pressure but cannot continuously control the pressure or air flow, the Soft Pneumatic Gripper had only two states: either on-state or off-state. The finger opening width were measured under each state.

Results

Figure 3:
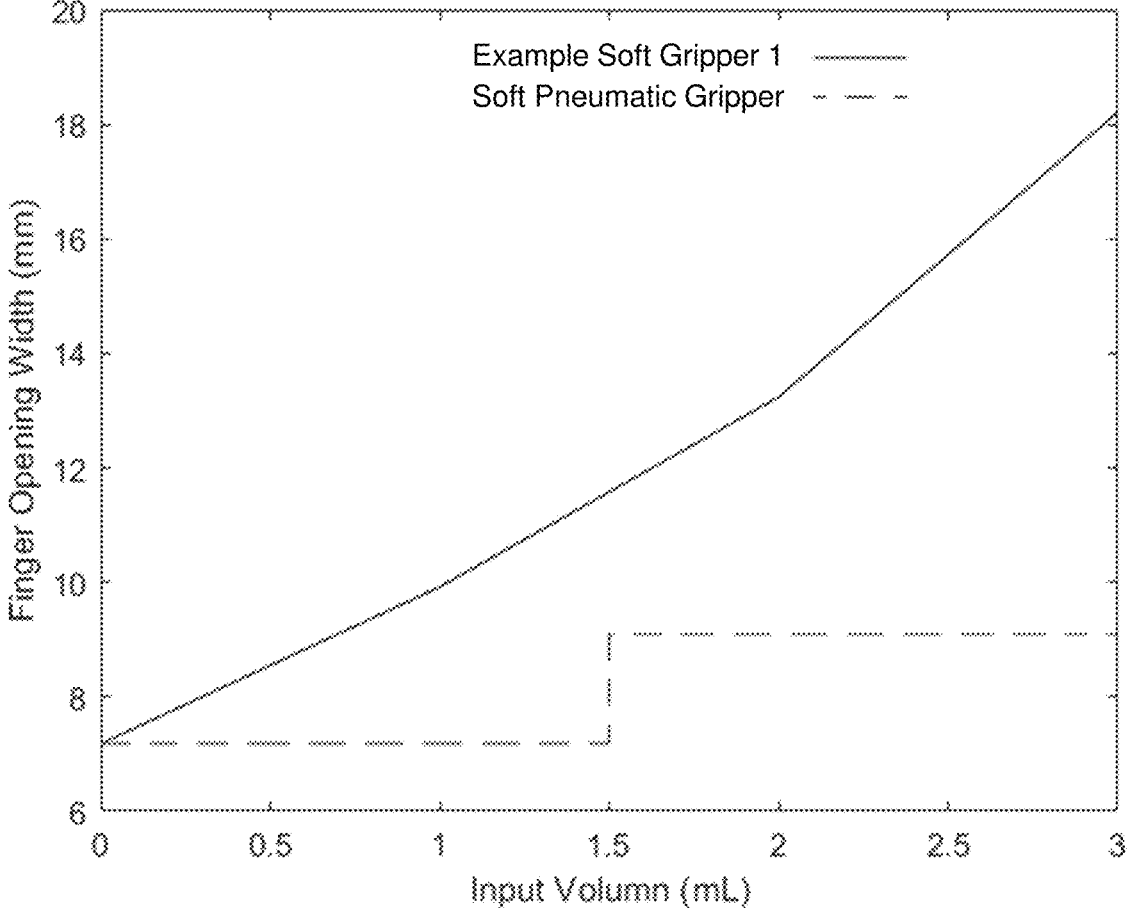
FIG. 3 is a chart showing the changes in finger opening width over input volume of Example Soft Gripper 1 and Soft Pneumatic Gripper in accordance with the same example embodiments as shown in FIG. 2.

FIG. 3 illustrates the changes in the finger opening width over input volume of Example Soft Gripper 1 and Soft Pneumatic Gripper, respectively. The results showed that the finger opening width of Soft Gripper 1 gradually increased following the increase in the input volume of the liquid. The finger opening width was able to expand to around 18 mm when the input volume is 3 mL. As for comparison, as Soft Pneumatic Gripper has only two states (on-state and off-state), the finger opening width can only expand from around 7 mm at the off-state to around 9 mm at the on-state. The results indicated that in comparison with Soft Pneumatic Gripper, the finger opening width of Example Soft Gripper 1 can be precisely controlled by the electro-hydraulic actuator assembly, making it useful for grasping small or fragile objects. The results also indicated that the maximum finger motion range of Example Soft Gripper 1 was much larger than Soft Pneumatic Gripper even if the overall gripper dimensions were similar (Table 1), thereby enabling Soft Gripper 1 to grasp objects with diverse range of sizes, shapes and textures.

Example 5—Object Grasping Tests

In this experiment, the performance of Example Soft Gripper 1 and Soft Pneumatic Gripper as described in Example 2 to grasp objects with different sizes and shapes were evaluated and compared.

Methods and Materials

Figure 4A:
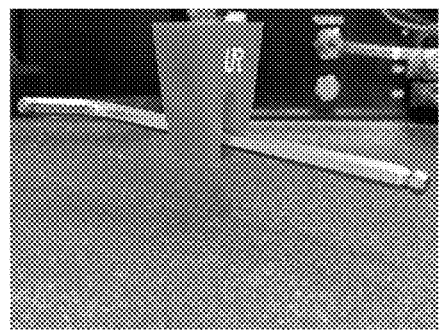
FIG. 4A to FIG. 4F illustrate the object grasping experiment setup of Example Soft Gripper 1 in accordance with the same example embodiment as shown in FIG. 2, showing 6 out of 6 kinds of industrial parts lying on a plane are successfully grasped.
Figure 4B:
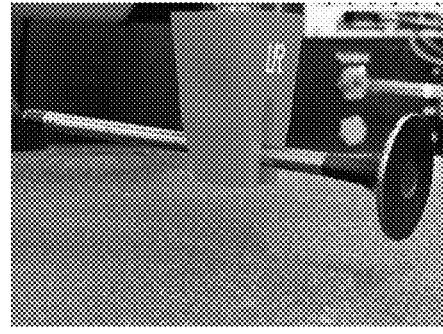
Figure 4C:
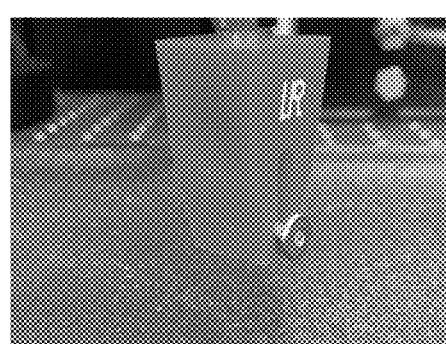
Figure 4D:
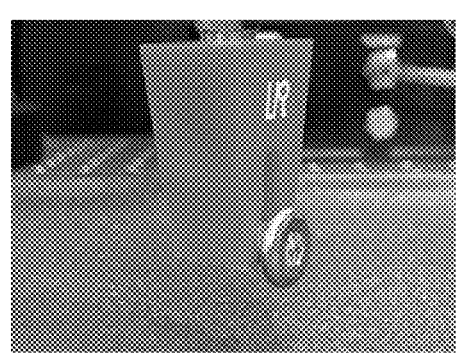

Example Soft Gripper 1 and Soft Pneumatic Gripper were commanded to grasp 6 kinds of different objects (industrial parts) with different sizes and shapes lying on a plane. The industrial parts included a hex wrench (as shown in FIGS. 4A and 4G), a pin (as shown in FIGS. 4B and 4H), screws with different shapes and sizes (as shown in FIGS. 4C, 4D, 4I and 4J), and connectors with different shapes and sizes (as shown in FIGS. 4E, 4F, 4K and 4L). If the part is picked up without dropping, the trial was considered as successful. Conversely, if the part cannot be picked up or the part was dropped after being picked up, the trial was considered as fail. Both Example Soft Gripper 1 and Soft Pneumatic Gripper were executing the same simple but effective "top-down" grasping instruction to minimize the influence of grasping angle.

Results

Figure 4E:
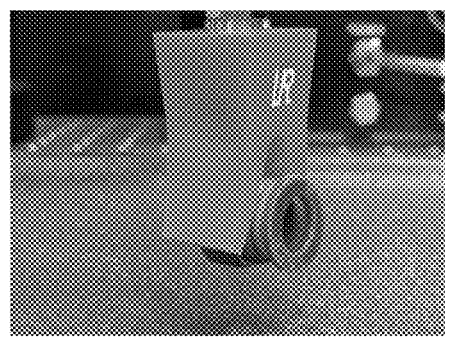
Figure 4F:
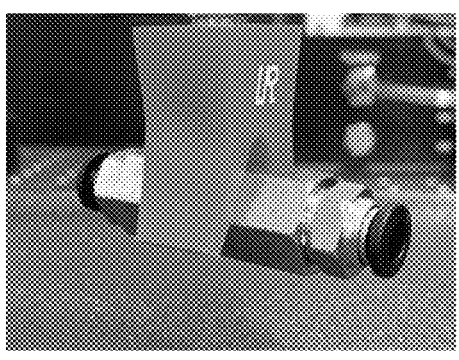
Figure 4G:
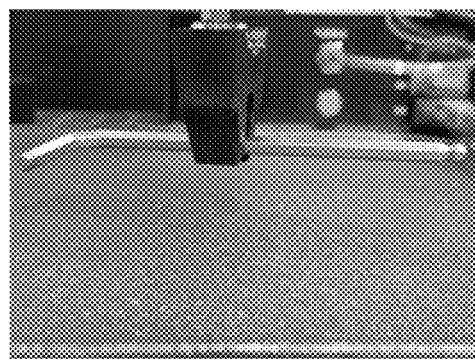
FIG. 4G to FIG. 4L illustrate the object grasping experiment setup of Soft Pneumatic Gripper in accordance with the same example embodiment as shown in FIG. 2, showing 3 out of 6 kinds of industrial parts lying on a plane are successfully grasped.
Figure 4H:
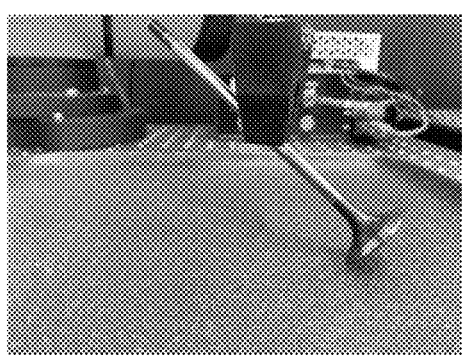
Figure 4I:
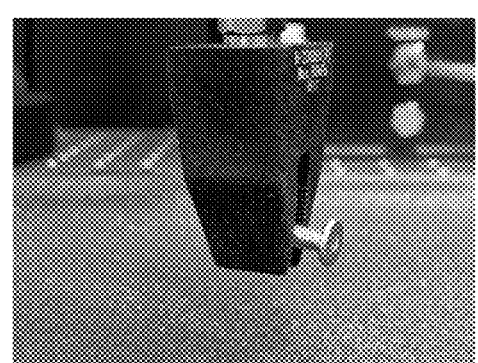
Figure 4J:
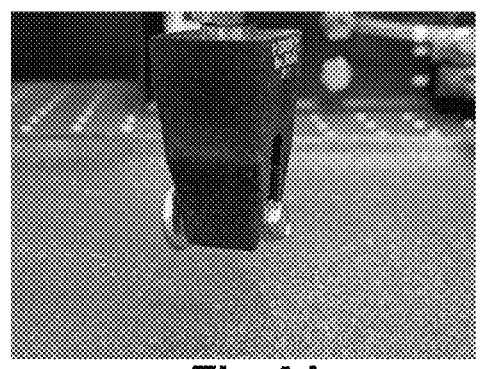
Figure 4K:
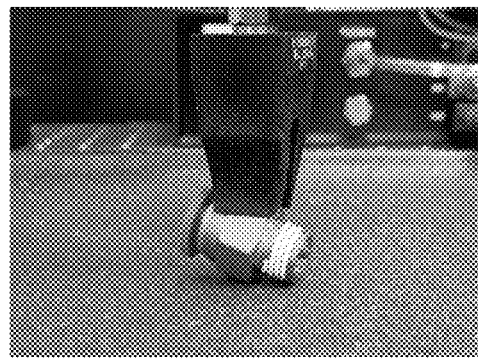
Figure 4L:
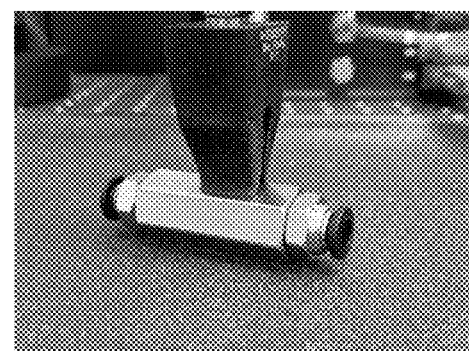

As shown in FIGS. 4A-4F, 6 out of 6 kinds of industrial parts as tested were successfully grasped by Example Soft Gripper 1. In particular, as shown in FIG. 4E and FIG. 4F, the finger opening of Soft Gripper 1 can be enlarged to an extent that is even larger than the overall width of the gripper body to grasp and hold the connectors with larger sizes and polygonal shapes. In comparison, as shown in FIGS. 4G-4L, only 3 out of 6 kinds of the objects (industrial parts) were successfully grasped by the Soft Pneumatic Gripper. Soft Pneumatic Gripper has failed in grasping the pin with a narrow body (FIG. 4H) and two connectors with larger sizes and polygonal shapes (FIG. 4K-4L). The results indicated that compared to Soft Pneumatic Gripper, Example Soft Gripper 1 is able to grasp and hold objects with diverse range of sizes, shapes and textures.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, in certain embodiments, the soft gripper includes two fingers. In other example embodiments, the soft gripper may include more than two fingers, such as three, four, five or more.

For example, the shape of the finger is described as right-angled trapezoid in Example 1 above, but other shapes and sizes may be used, as long as it is able to grasp one or more objects.

For example, the soft gripper is provided with two finger is described above, but other numbers of fingers may be used, such as, three, four, five, six, seven, eight, nine, and ten or more, as long as it is able to grasp one or more objects.

For example, in certain embodiments, the soft gripper is provided with two fingers that are structurally similar in size and shape, but different size and shape of fingers may be provided, such as, three, four, five, six, seven, eight, nine, ten or more, as long as it is able to grasp one or more objects.

For example, in certain embodiments, the ratio of the length of the finger connecting portion to the length of the two fingers is substantially equal or smaller than 1:1, but other ratios may be used, such as, substantially equal or smaller than 1:2, 1:1, 1:0.95, 1:0.9, 1:0.85, 1:0.8, 1:0.75, 1:0.7, 1:0.65, 1:0.6, 1:0.55, 1:0.5, 1:0.45, 1:0.4, etc.

For example, in certain embodiments, liquid medium is used as hydraulic liquid for the robotic system, but other medium such as gaseous medium may be used.

For example, in certain embodiments, the provided soft grippers and end effectors can grasp and hold drugs such as pills and tablets or industrial parts, but other objects with various sizes and shapes may also be applicable.

For example, in some embodiments, the channel is provided as two channel components (proximal and distal channels), but in other embodiments, different numbers (for example, 1, 3, 4, 5, or more) of channel components with different lengths, diameters, and/or materials can be changed or replaced for use according to the user's preference and actual need, as long as these channel components can be directly connected and sealed to each other to form part of the closed space.

For example, in some embodiments, the fingers are extended from the finger connecting portion of the gripper body (i.e., they are integrally formed as one piece), but in other embodiments, the fingers can be separate components from the gripper body and can be configured to be changeably (either directly or indirectly) attached to the finger connecting portion, such that multiple fingers with different shapes, sizes and/or materials can be easily changed, or replaced for use according to the user's preference and actual need.

What is claimed is:

1. A robotic end effector, comprising:
(a) a soft gripper, comprising:
    a gripper body comprising a finger connecting portion; and
    at least two fingers connected to the finger connecting portion,
    wherein the gripper body further comprises a gripper cavity therein;
    wherein the finger connecting portion and the at least two fingers define a working space therewithin, the working space comprises an opening between proximal ends of the at least two fingers;
    wherein each of the at least two fingers further comprises a finger barb substantially extending into the opening to partially close up the opening; and
(b) an electro-hydraulic actuator assembly, comprising:
    an actuator that is operatively driven by an electric motor; and
    a chamber that comprises a chamber variable volume controlled by the actuator,
    wherein the chamber variable volume is in liquid communication with the gripper cavity to form a closed space filled with a liquid, such that when in operation, the shape of the gripper cavity can be changed in response to a liquid pressure under control of the chamber variable volume by the electro-hydraulic actuator assembly, such as to control a finger gap between the at least two fingers, thereby controlling gripping action of an object by the at least two fingers at least partially within the working space.

2. The robotic end effector of claim 1, wherein the at least two fingers and the gripper body are casted as a single piece made of one or more elastomer materials.

3. The robotic end effector of claim 1, wherein the gripper cavity substantially extends into the finger connecting portion, and the at least two fingers are substantially solid.

4. The robotic end effector of claim 1, wherein the finger connecting portion comprises at least one side wall and a finger connecting wall that together define the gripper cavity, the at least one side wall is configured to be thicker than the finger connecting wall.

5. The robotic end effector of claim 4, wherein the finger connecting wall is arc-shaped.

6. The robotic end effector of claim 1, wherein the at least two fingers are equidistantly spaced relative to a central longitudinal axis of the gripper.

7. The robotic end effector of claim 1, wherein a ratio of length of the finger connecting portion to length of the at least two fingers is substantially equal to or smaller than 1:1.

8. The robotic end effector of claim 7, wherein the finger gap is substantially equal or larger than width of each of the at least two fingers.

9. The robotic end effector of claim 1, wherein the electro-hydraulic actuator assembly further comprises:
    a piston rod sized and shaped to match with the chamber to form the variable volume; and
    a push rod that connects the electric motor with the piston rod,
    wherein the electric motor is configured to provide rotational force to the push rod and translate into linear force to the piston rod.

10. The robotic end effector of claim 1, wherein the piston rod further comprises at least one sealing ring.

11. The robotic end effector of claim 1, further comprising a channel connecting the chamber and the gripper in liquid communication.

12. The robotic end effector of claim 1, wherein the channel further comprises:
    a proximal channel having a proximal channel cross section; and
    a distal channel having a distal channel cross section,
    wherein the distal channel connects the proximal channel and the chamber in liquid communication.

13. The robotic end effector of claim 12, wherein the distal channel cross section is smaller than a cross section of the chamber but larger than the proximal channel cross section.

14. The robotic end effector of claim 12, wherein the chamber further comprises a reduced diameter port configured to connect with the distal channel in liquid communication.

15. The robotic end effector of claim 12, further comprising a buffer sized and shaped to substantially cover connection region between the proximal channel and the distal channel.

16. The robotic end effector of claim 15, further comprising a fixing flange that is fixedly connected with the chamber and is sized and shaped to cover at least a portion of the channel.

17. The robotic end effector of claim 16, wherein the fixing flange further comprises a proximal opening, and wherein the buffer further comprises a threaded region sized and shaped to thread with the proximal opening.

18. A robotic end effector, comprising:
(a) a soft gripper, comprising
    a gripper body comprising a finger connecting portion; and
    two fingers extending from the finger connecting portion, wherein the gripper body further comprises a gripper cavity therein;

wherein the finger connecting portion and the two fingers define a working space therewithin with an opening between proximal ends of the two fingers, wherein each of the two fingers further comprises a finger barb substantially extending into the opening to partially close up the opening; and (b) an electro-hydraulic actuator assembly, comprising an actuator that is operatively driven by an electric motor; and a chamber that comprises a chamber variable volume controlled by the actuator, wherein the chamber variable volume is in liquid communication with the gripper cavity to form a closed space filled with a liquid, such that when in operation, under normal liquid pressure, the gripper cavity maintains at a resting state;

under negative liquid pressure, the gripper cavity will be deformed into one or more contracting states; the shape of the gripper cavity changes in response to the negative liquid pressure by reducing the chamber variable volume under control of the electro-hydraulic actuator assembly such that a finger gap between the at least two fingers is reduced, thereby the opening is reduced; and under higher liquid pressure, the gripper cavity will be deformed into one or more expanding states; the shape of the gripper cavity in the working states changes in response to the higher liquid pressure by increasing the chamber variable volume under control of the electro-hydraulic actuator assembly such that the finger gap is enlarged, thereby the opening is enlarged.

\* \* \* \* \*